United States Patent [19]

O'Brien et al.

[11] Patent Number: 4,519,929
[45] Date of Patent: May 28, 1985

[54] LUBRICATING OIL COMPOSITION CONTAINING N-ALLYL AMIDE GRAFT COPOLYMERS

[75] Inventors: Joseph P. O'Brien, Kirkwood; Andrew G. Papay, Manchester, both of Mo.

[73] Assignee: Edwin Cooper, Inc., St. Louis, Mo.

[21] Appl. No.: 350,205

[22] Filed: Feb. 19, 1982

[51] Int. Cl.$^3$ .............................................. C10M 1/32
[52] U.S. Cl. .................................. 252/51.5 A; 44/62; 44/71; 525/296
[58] Field of Search ................... 252/51.5 A; 525/296

[56] References Cited

U.S. PATENT DOCUMENTS

| | | | |
|---|---|---|---|
| 3,033,790 | 5/1962 | Nelson | 252/51.5 A |
| 3,089,832 | 5/1963 | Black et al. | 252/51.5 A X |
| 3,687,849 | 8/1972 | Abbott | 252/47.5 |
| 4,139,417 | 2/1979 | Marie et al. | 252/51.5 A |
| 4,146,489 | 3/1979 | Stambaugh et al. | 252/50 |
| 4,181,618 | 1/1980 | Durand et al. | 252/51.5 A |
| 4,194,984 | 3/1980 | Elliott et al. | 252/51.5 A |
| 4,340,689 | 7/1982 | Joffrion | 525/296 X |

FOREIGN PATENT DOCUMENTS

| | | | |
|---|---|---|---|
| 728709 | 2/1966 | Canada | 252/51.5 A |
| 1929811 | 6/1969 | Fed. Rep. of Germany | |

*Primary Examiner*—Andrew Metz
*Attorney, Agent, or Firm*—Donald L. Johnson; John F. Sieberth; W. G. Montgomery

[57] ABSTRACT

Lubricating oil dispersancy is improved by adding to the oil a product made by grafting an N-allyl amide (e.g. N,N-diallyl formamide) to an olefin polymer having a molecular weight of about 500–500,000 (e.g. ethylene/propylene/diene copolymer).

31 Claims, No Drawings

LUBRICATING OIL COMPOSITION CONTAINING N-ALLYL AMIDE GRAFT COPOLYMERS

BACKGROUND

Ashless dispersants suitable for use in lubricating oil are known. One such additive is made by reacting a hydrocarbon-substituted succinic anhydride with an amine such as ethylene polyamine (U.S. Pat. No. 3,272,746). More recently, effective dispersants have been made by grafting maleic anhydride and a comonomer such as alkyl methacrylate onto a high molecular weight olefin backbone followed by amidation (U.S. Pat. No. 4,160,739). Another effective dispersant can be made by simply grafting a vinyl-substituted nitrogen compound such as vinyl pyridine or N-vinyl pyrrolidone onto a high molecular weight olefin backbone (U.S. Pat. No. 4,146,489).

SUMMARY

It has now been discovered that a very effective lubricating oil dispersant especially useful in the crankcase of an internal combustion engine can be obtained by grafting N-allyl amides onto an olefin polymer backbone.

DESCRIPTION OF PREFERRED EMBODIMENTS

A preferred embodiment of the invention is an ashless dispersant suitable for use in lubricating oil comprising an olefin polymer backbone having a molecular weight of about 500–500,000 to which is grafted an N-allyl amide having the structure

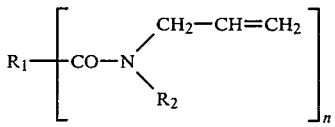

wherein $R_1$ is selected from hydrogen and hydrocarbon groups containing 1 to about 30 carbon atoms or may be absent, and $R_2$ is selected from the group consisting of hydrogen, alkyls containing 1–30 carbon atoms, cycloalkyls containing 6–10 carbon atoms, aryls containing 6–10 carbon atoms, and allyl, and n is such that when $R_1$ is hydrogen n is 1 and when $R_1$ is absent n is 2.

The above ashless dispersants can be made by a process comprising reacting an olefin polymer having an average molecular weight of about 500–500,000 with an N-allyl amide having the structure

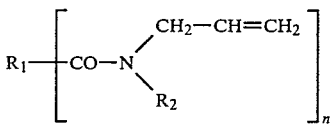

wherein $R_1$ is selected from hydrogen and hydrocarbon groups containing 1 to about 30 carbon atoms or may be absent, and $R_2$ is selected from the group consisting of hydrogen, alkyls containing 1–30 carbon atoms, cycloalkyls containing 6–10 carbon atoms, aryls containing 6–10 carbon atoms, and allyl, and n is 1 or 2 such that when $R_1$ is hydrogen, and when $R_1$ is absent n is 2, said reaction being conducted in the presence of a free radical generating catalyst at a temperature high enough to generate free radicals up to a temperature of about 250° C.

When $R_1$ is absent and n is 2 in the above formula, the N-allyl amide is an N-allyl oxamide derivative.

Useful olefin polymers include the polymers of ethylene, propylene, isobutene, 1-octene and other alpha-olefins containing up to about 12 carbon atoms. A useful olefin homopolymer is polybutene, especially polyisobutylene having an average molecular weight of about 500–10,000.

Ethylene/propylene copolymers are also quite useful. Such copolymers can have a molecular weight of from about 500 to 500,000 or higher. When the polymer substituent has a molecular weight above about 10,000, the resulting dispersant will also have viscosity index improving properties.

Ethylene/propylene diene polymers are preferred. Such polymers preferably contain about 30–79 weight percent ethylene units, 20–69 weight percent propylene units, and about 1–10 weight percent diene units. Representative dienes include 1,4-hexadiene, 1,5-hexadiene, 1,5-cyclopentadiene, 1,4-pentadiene, 2-methyl-1,5-hexadiene, dicyclopentadiene, methylene norbornene, 2,4-dimethyl-1,7-octadiene, isoprene, butadiene, ethyl norbornadiene, and the like. Preferred dienes are 1,4-hexadiene, 2,5-norbornadiene, dicyclopentadiene and ethylidene norbornene.

Useful olefin copolymers are described in U.S. Pat. Nos. 3,522,180; 3,551,336; 3,598,738; 3,790,480; 3,691,078; 3,389,087; 3,697,429; all of which are incorporated herein by reference for their disclosure of olefin copolymers. Suitable ethylene/propylene copolymers or ethylene/propylene/diene copolymers are available commercially in a wide range of molecular weights.

A wide variety of N-allyl amides are useful in making the additives. Some non-limiting examples include N,N-diallyl formamide, N,N-diallyl acetamide, N,N-diallyl propionamide, N,N-diallyl butyramide, N,N-diallyl dodecamide, N,N-diallyl octadecamide, N,N-diallyl triacontamide, N,N-diallyl benzamide, N,N-diallyl naphthamide, N,N-diallyl-p-methyl benzamide, N-allyl formamide, N-allyl-N-methyl acetamide, N-allyl-N-ethyl propionamide, N-allyl-N-dodecyl formamide, N-allyl-N-eicosyl dodecamide, N-allyl-N-triacontyl benzamide, N-allyl-p-methyl benzamide, N,N'-diallyl oxamide, N,N,N'-triallyl oxyamide, N,N,N',N'-tetraallyl oxamide, N,N-diallyl acrylamide and N-allyl-N-methyl acrylamide.

The $R_1$ group may contain functional groups such as ester, amino, amido, carboxyl, hydroxyl, ether, thioether, sulfonate, phosphorus-containing groups, cyano, sulfonyl, sulfinyl, keto and aldehyde groups. Examples are N,N-diallyl lactamide, N,N-diallyl levulinamide, N,N-diallyl ethyl thioacetamide, 3-(N',N'-diethylamino)N,N-diallyl propionamide, N,N-diallyl 3-cyanopropionamide, N,N-diallyl 3-methyl sulfonyl propionamide, ethyl N,N-diallyl oxamate, and the like, including mixtures thereof.

The more preferred N-allyl amides are the N-allyl formamides and the most preferred is N,N-diallyl formamide.

Other ethylenically unsaturated monomers can be co-grafted onto the olefin polymer backbone together with the N-allyl amides. These co-grafted products are within the scope of the invention. For example, other co-graft monomers include vinyl pyridine, N-vinyl pyrrolidone, $C_{1-30}$ alkyl methacrylate, and the like including mixtures thereof.

The amount of the co-grafted monomer used in addition to the N-allyl amide can vary over a wide range. When used they are preferably reacted in the same concentration range as will be set forth for the N-allyl amides. The other monomers can be grafted before or after the N-allyl amide graft but are preferably grafted concurrently with the N-allyl amide.

The N-allyl amide can be grafted to the olefin polymer by forming a mixture of olefin polymer, N-allyl amide and a small amount of a free radical-generating catalyst and heating the mixture to a temperature high enough to cause the graft reaction to proceed at a reasonable rate but not so high as to cause destructive decomposition of the reactants or products.

The amount of N-allyl amide or other co-grafted monomer can vary over a wide range. A useful range is about 10 to 500 grams for each Kg of olefin polymer. A more preferred range is about 20 to 250 grams of each Kg of olefin polymer and most preferably about 50 to 200 grams of N-allyl amide for each Kg of olefin polymer. An excess amount of the N-allyl amide can be used and any that remains unreacted after the reaction can be removed by distillation.

The graft reaction is catalyzed by a free radical-generating compound such as a peroxide or dialkyl, diacyl, alkyl-acyl peroxide, hydroperoxide, ketone peroxide, or azo compound when each is used in an appropriate temperature range or reaction is initiated by a co-catalyst such as metal salts or complexes or externally by means of irradiation. Representative examples of such catalysts include di-tert-butyl peroxide, dicumyl peroxide, tert-butyl perbenzoate, benzoyl peroxide, cyclohexanone peroxide, Lupersol 130 (Trade Mark-Pennwalt Corp.), azo-bisisobutyronitrile and the like, including mixtures thereof. Di-tert-butyl peroxide and dicumyl peroxide and mixtures thereof are preferred.

The amount of free-radical-generating catalysts need only be a catalytic amount. A useful range is about 1–200 grams per Kg of olefin polymer. A more preferred range is about 20–100 grams per Kg of olefin polymer. The catalyst may all be added at the start of the graft reaction or made by adding in portions during the course of the reaction.

The mixture of olefin polymer and N-allyl amide and any other co-grafted monomer together with the catalyst is stirred at reaction temperature. The temperature should be high enough to cause the catalyst to form free radicals. A useful range in which to experiment is from an ambient temperature up to about 250° C. depending upon the catalyst used. When using di-tert-butyl peroxide or dicumyl peroxide, the preferred temperature range is about 100°–200° C.

Olefin polymers having molecular weights above about 2000 are very viscous, and in fact, above 10,000, such olefin polymers are usually rubber-like materials. When the olefin polymer is too viscous to stir or is a rubber, it is preferred to conduct the reaction in an inert solvent. Useful solvents include aliphatic hydrocarbons such as nonane, decane, and the like. Likewise, chlorinated hydrocarbons can be used such as chlorobenzene, dichlorobenzene, dichlorotoluene and the like. The presence of olefins and aromatics is generally deleterious although small amounts may be tolerated if the amounts of reactants are increased.

The preferred solvent is a neutral mineral oil commonly referred to as process oil. This oil is preferably a hydrogen-treated oil which has been processed through a refinery procedure such as hydrocracking or hydrotreating.

The amount of oil diluent used should be sufficient to produce a handleable product. When effective grafting is obtained, the viscosity of the product may increase significantly. Thus, the higher molecular weight polymers require greater dilution. To improve handleability the product may be mechanically homogenized.

The amount used should be the amount required to dissolve the olefin polymer and form a stirrable mixture. This can vary from none in the case of low molecular weight olefin polymers (e.g. 500–2000 molecular weight) up to about 20 Kg per Kg of olefin polymer in the case of high molecular weight olefin polymer (e.g. ethylene/propylene copolymers and ethylene/propylene/diene copolymers having molecular weights of about 20,000–500,000). Molecular weights are number average.

The rubber-like polymers can be dissolved in the solvent by cutting the polymer into small pieces and stirring the pieces in the solvent oil at an elevated temperature (e.g. 50°–250° C.) until a homogeneous solution forms.

The graft reaction is conducted for a time long enough to permit the N-allyl amides to graft onto the olefin polymer backbone. The time is not a critical limitation. A useful period is about 30 minutes to about 4 hours, although longer or shorter periods may be used.

The following examples serve to illustrate how to make the additives.

EXAMPLE 1

In a reaction vessel was placed 6230 grams of an 80 neutral hydrocracked mineral oil. This was heated and stirred under nitrogen at 180° C. while adding 770 grams of an ethylene propylene non-conjugated diene rubbery tetrapolymer (Ortholeum 2052 Reg. T.M., E. I. duPont de Nemours and Co.) cut up into small pieces. The copolymer contained 53 weight percent ethylene units, 42 weight percent propylene units, approximately 5 percent non-conjugated diene units ($\overline{M}_n$ 40,000, $\overline{M}_w$ 100,000). This resulted in a mineral oil solution containing 11 weight percent olefin copolymer. The solution was cooled to 160° C. and to it was added 60.1 grams of N,N-diallyl formamide, 13.3 grams of di-tert-butyl peroxide, and 31.3 grams of dicumyl peroxide. Stirring was continued under nitrogen for one hour while gradually heating to 170° C. The temperature was maintained for 30 minutes longer. The reaction mixture was cooled resulting in an oil solution of an N,N-diallyl formamide grafted olefin polymer which had both dispersancy and viscosity index improving properties in lubricating oil.

EXAMPLE 2

In a reaction vessel was placed 273 grams of an 11 weight percent oil solution of the copolymer described in Example 1. This was stirred and heated under nitrogen to under 160° C. at which time there was added 2.3 grams diallyl formamide, 0.4 ml. di-tert-butyl peroxide and 0.1 gram of dicumyl peroxide. The mixture was stirred for one hour under nitrogen while gradually heating to 170° C. The product was then cooled resulting in an oil solution of an active dispersant VI improving additive.

EXAMPLE 3

In a reaction vessel was placed 288.7 grams of an 11 weight percent mineral oil solution of the copolymer described in Example 1. To this was added 15.2 grams of N,N-diallyl acetamide and 0.3 ml. di-tert-butyl peroxide. The mixture was stirred and heated under nitrogen for 1.5 hours while heating to 180° C. Stirring was continued at 180° C. for 30 minutes. The product was then cooled to 100° C. and an additional 0.3 ml. of di-tert-butyl peroxide was added. The mixture was stirred and heated to 180° C. over a 30 minute period and stirred at that temperature for one hour. The resulting product was vacuum-stripped by applying 20 inches Hg vacuum. The reaction product was then cooled resulting in a very effective dispersant VI improving additive.

EXAMPLE 4

In a reaction vessel was placed 230.8 grams of an 11 weight percent solution of the copolymer of Example 1 in 80 neutral mineral oil. To this was added 3 grams of N,N-diallyl formamide, and the mixture was heated under nitrogen to 150° C. At that temperature, 0.15 ml. of di-tert-butyl peroxide was added, and the solution stirred for 30 minutes while gradually heating to 170° C. At that temperature an additional 0.15 ml. of di-tert-butyl peroxide was added and stirring continued for one hour. A vacuum of 28 inches Hg was then applied to remove volatiles while passing a stream of nitrogen through the reaction mixture. The product was then cooled, giving a viscous mineral oil solution of an effective dispersant VI improver for use in lubricating oil.

EXAMPLE 5

In a reaction vessel was placed 171.6 grams of 11 weight percent copolymer solution as described in Example 1. To this was added one gram of N,N-diallyl formamide and 1.6 ml. of a 50 percent solution of dicumyl peroxide. The mixture was then stirred under nitrogen and heated to 160° C. Stirring was continued at 160°–165° C. for a 30 minutes period while slowly adding 5 ml. of a chlorobenzene solution which contained 1.5 grams of N,N-diallyl formamide and 0.9 grams of dicumyl peroxide. Stirring was continued for 30 minutes while heating to 170° C. The product was then cooled resulting in a very effective lubricating oil additive.

EXAMPLE 6

This example illustrates the preparation of a diallyl formamide grafted olefin polymer which contains additional grafts of a second monomer.

In a reaction vessel was placed 271.8 grams of an 11 weight percent 80 neutral oil solution of the copolymer described in Example 1. To this was then added 1.1 gram of N,N-diallyl formamide and 1.1 gram of N-vinyl pyrrolidone. This was stirred and heated under nitrogen to 145° C. at which time 3.8 ml. of a 50 percent solution of dicumyl peroxide in chlorobenzene was added. Heating was continued for one hour while gradually raising the temperature to 165° C. Stirring was continued at that temperature for 3 hours and 17 minutes at which time the reaction product was cooled resulting in an effective lubricating oil additive.

EXAMPLE 7

In a reaction vessel was placed 174.2 grams of an 11 weight percent 80 neutral oil solution of the copolymer of Example 1. To this was added 1.7 gram N,N-diallyl formamide, and 0.5 gram N-vinyl pyrrolidone. The mixture was stirred and heated under nitrogen to 160° C. at which time 2.4 ml. of a 50 percent solution of dicumyl peroxide in chlorobenzene and 0.6 ml. of di-tert-butyl peroxide were added. Stirring was continued for one hour and 36 minutes while gradually heating to 170° C. The product was cooled, leaving an oil solution of an effective dispersant VI improver.

EXAMPLE 8

In a reaction vessel was placed 27 1.5 grams of an 11 weight percent solution of the copolymer of Example 1 in 80 neutral mineral oil. To this was added 2.6 grams of N,N-diallyl acetamide. This mixture was stirred and heated under nitrogen to 150° C. At that temperature 1.6 ml. of di-tert-butyl peroxide was added and stirring and heating continued for one hour and 35 minutes while gradually increasing the temperature to 170° C. The mixture was cooled, resulting in a very effective lubricating oil additive.

The additives are used in lubricating oil at a concentration which achieves the desired level of dispersancy and, in the case of the high molecular weight polymers, VI improvement. They may also be used in combination with other dispersants and VI improvers to achieve desired properties. A useful concentration range is about 0.1 to 10 weight percent of the grafted polymer excluding diluent oil.

The additives can be used in mineral oil or in synthetic oils of viscosity suitable for use in the crankcase of an internal combustion engine. Crankcase lubricating oils have a viscosity up to about 80 SUS at 210° F.

Crankcase lubricating oils of the present invention have a viscosity up to about SAE 50. Sometimes such motor oils are given a classification at both 0° and 210° F., such as SAE 10W 40 or SAE 5W 30.

Mineral oils include those of suitable viscosity refined from crude oil from all sources including Gulfcoast, midcontinent, Pennylsvania, California, Mideast, North Sea, Alaska and the like. Various standard refinery operations can be used in processing the mineral oil.

Synthetic oil includes both hydrocarbon synthetic oil and synthetic esters. Useful synthetic hydrocarbon oils include liquid polymers of α-olefins having the proper viscosity. Especially useful are the hydrogenated liquid oligomers of $C_{6-12}$ α-olefins such as α-decene trimer. Likewise, alkylbenzenes of proper viscosity can be used, such as didodecylbenzene.

Useful synthetic esters include the esters of both monocarboxylic acid and polycarboxylic acid as well as monohydroxy alkanols and polyols. Typical examples are didodecyl adipate, trimethylol propane tripelargonate, pentaerythritol tetracaproate, di-(2-ethylhexyl)adipate, dilauryl sebacate and the like. Complex esters prepared from mixtures of mono- and dicarboxylic acid and mono- and polyhydroxyl alkanols can also be used.

Blends of mineral oil with synthetic oil are particularly useful. For example, blends of 10–25 weight percent hydrogenated α-decene trimer with 75–90 weight percent 150 SUS (100° F.) mineral oil results in an excellent lubricant. Likewise, blends of about 15–25 weight percent di-(2-ethylhexyl)adipate with mineral oil of proper viscosity results in a superior lubricating oil. Also blends of synthetic hydrocarbon oil with synthetic esters can be used. Blends of mineral oil with synthetic oil are especially useful when preparing low viscosity oil (e.g. SAE 5W 20) since they permit these low viscosities without contributing excessive volatility.

The more preferred lubricating oil composition includes zinc dihydrocarbyldithiophosphate (ZDDP) in combination with the present additives. Both zinc dialkyldithiophosphates and zinc dialkaryldithiophosphates as well as mixed alkyl-aryl ZDDP are useful. A typical alkyl-type ZDDP contains a mixture of isobutyl and isoamyl groups. Zinc di-(nonylphenyl)dithiophosphate is a typical aryl-type ZDDP. Good results are achieved using sufficient ZDDP to provide about 0.01–0.5 weight percent zinc. A preferred concentration supplies about 0.05–0.3 weight percent zinc.

Another additive used in the oil compositions are the alkaline earth metal petroleum sulfonates or alkalines earth metal alkaryl sulfonates. Examples of these are calcium petroleum sulfonates, magnesium petroleum sulfonates, barium alkaryl sulfonates, calcium alkaryl sulfonates or magnesium alkaryl sulfonates. Both the neutral and the overbased sulfonates having base numbers up to about 400 can be beneficially used. These are used in an amount to provide about 0.05–1.5 weight percent alkaline earth metal and more preferably about 0.1–1.0 weight percent. In a most preferred embodiment the lubricating oil composition contains a calcium petroleum sulfonate or alkaryl (e.g. alkylbenzene)sulfonate.

Other viscosity index improvers can be included such as the polyalkylmethacrylate type or the ethylene-propylene copolymer type. Likewise, styrene-diene VI improvers or styrene-acrylate copolymers can be used. Alkaline earth metal salts of phosphosulfurized polyisobutylene are useful.

Most preferred crankcase oils also contain supplemental ashless dispersants such as the polyolefin-substituted succinamides and succinimides of polyethylene polyamines such as tetraethylenepentamine. The polyolefin succinic substituent is preferably a polyisobutene group having a molecular weight of from about 800 to 5000. Such ashless dispersants are more fully described in U.S. Pat. No. 3,172,892 and U.S. Pat. No. 3,219,666, incorporated herein by reference.

Another useful class of ashless dispersants are the polyolefin succinic esters of mono- and polyhydroxy alcohols containing 1 to about 40 carbon atoms. Such dispersants are described in U.S. Pat. No. 3,381,022 and U.S. Pat. No. 3,522,179.

Likewise, mixed ester amides of polyolefin substituted succinic acid made using alkanols, amines and/or aminoalkanols represent a useful class of ashless dispersants.

The succinic amide, imide and or ester type ashless dispersants may be boronated by reaction with a boron compound such as boric acid. Likewise, the succinic amide, imide, and or ester may be oxyalkylated by reaction with an alkylene oxide such as ethylene oxide or propylene oxide.

Other useful ashless dispersants include the Mannich condensation products of polyolefin-substituted phenols, formaldehyde and polyethylene polyamine. Preferably, the polyolefin phenol is a polyisobutylene-substituted phenol in which the polyisobutylene group has a molecular weight of from about 800 to 5000. The preferred polyethylene polyamine is tetraethylene pentamine. Such Mannich ashless dispersants are more fully described in U.S. Pat. Nos. 3,368,972; 3,413,347; 3,442,808; 3,448,047; 3,539,633; 3,591,598; 3,600,372; 3,634,515; 3,697,574; 3,703,536; 3,704,308; 3,725,480; 3,726,882; 3,736,357; 3,751,365; 3,756,953; 3,792,202; 3,798,165; 3,798,247 and 3,803,039.

The effectiveness of the additives as lubricating oil dispersants was measured using a bench dispersancy test. In this test, an asphaltene sludge was made by air oxidation of 100 neutral oil using an iron naphthenate catalyst. The oxidized oil containing precipitated sludge was diluted with heptane to dissolve that part of the sludge which was soluble in heptane. The sludge saturated heptane solution was filtered and stabilized with a small amount of butanol and used as the test sludge solution.

The test was conducted by mixing 1 ml. of sludge solution into 10 ml. 100 neutral mineral oil containing various concentrations of test additives. The test samples were left standing for 16 plus hours and then rated visually. The test criterion was the lowest concentration of dispersant that prevent any precipitate formation. Thus, the lower the concentration, the more effective the dispersant. A present commercial dispersant VI improver is effective down to 0.25 weight percent giving a precipitate at 0.125 weight percent.

The following table shows the performance of various additives at different concentrations.

| Additive of Example | Lowest Effective Concentration (wt. percent)[1] |
| --- | --- |
| 1 | 0.125 |
| 2 | <0.062 |
| 3 | 0.25 |
| 4 | 0.25 |
| 5 | 0.25 |
| 6 | 0.25 |
| 7 | 0.125 |
| 8 | <0.062 |

[1]Concentration of product as made including diluent oil.

These results show that the additives were quite effective at concentrations as low as 0.062 percent.

We claim:

1. An ashless dispersant suitable for use in lubricating oils and liquid fuels, said dispersant being an oil-soluble product made by a process comprising reacting an olefinic hydrocarbon polymer having an average molecular weight of about 500–500,000 with an N-allyl amide having the structure

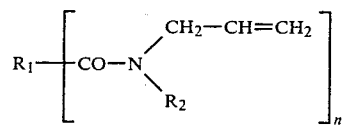

wherein $R_1$ is selected from hydrogen and saturated hydrocarbon groups containing 1 to about 30 carbon atoms or $R_1$ may be absent and $R_2$ is selected from the group consisting of hydrogen, alkyls containing 1–30 carbon atoms, cycloalkyls containing 6–10 carbon atoms, aryls containing 6–10 carbon atoms, and allyl and n is 1 or 2 such that when $R_1$ is hydrogen n is 1, and when $R_1$ is absent n is 2, said reaction being conducted in the presence of a free radical generating catalyst at a temperature high enough to generate free radicals up to a temperature of about 250° C.

2. An ashless dispersant of claim 1 wherein said olefin polymer is a copolymer of ethylene and $C_{3-12}$ alpha olefin and said copolymer has an average molecular weight of about 10,000–200,000.

3. An ashless dispersant of claim 2 wherein said N-allyl amide is an N-allyl formamide.

4. An ashless dispersant of claim 3 wherein said N-allyl formamide is N,N-diallyl formamide.

5. An ashless dispersant of claim 2 wherein said N-allyl amide is N,N-diallyl acetamide.

6. An ashless dispersant of claim 1 wherein said olefin polymer is a copolymer of ethylene, a $C_{3-12}$ alpha-olefin and at least one diene containing 4–15 carbon atoms.

7. An ashless dispersant of claim 6 wherein said copolymer contains about 30–79 weight percent ethylene units, 20–69 weight percent propylene units, and about 1–10 weight percent diene units.

8. An ashless dispersant of claim 7 wherein said N-allyl amide is an N-allyl formamide.

9. An ashless dispersant of claim 8 wherein said N-allyl formamide is N,N-diallyl formamide.

10. An ashless dispersant of claim 7 wherein said N-allyl amide is N,N-diallyl acetamide.

11. An ashless dispersant of claim 7 wherein said diene is selected from the group consisting of 1,4-hexadiene, 2,5-norbornadiene and dicyclopentadiene.

12. An ashless dispersant of claim 11 wherein said N-allyl amide is an N-allyl formamide.

13. An ashless dispersant of claim 12 wherein said N-allyl formamide is N,N-diallyl formamide.

14. An ashless dispersant of claim 11 wherein said N-allyl amide is N,N-diallyl acetamide.

15. A lubricating oil composition comprising a major amount of an oil having a lubricating viscosity and a minor amount sufficient to improve dispersancy of a dispersant of claim 1.

16. An oil composition of claim 15 wherein said olefin polymer is a copolymer of ethylene and an alpha-olefin containing 3–12 carbon atoms and said copolymer has an average molecular weight of about 10,000–200,000.

17. An oil composition of claim 16 wherein said olefin polymer is a copolymer of ethylene, an alpha-olefin containing 3–12 carbon atoms and at least one diene containing 4–15 carbon atoms.

18. An oil composition of claim 17 wherein said copolymer contains about 30–79 weight percent ethylene units, 20–69 weight percent propylene units, and about 1–10 weight percent diene units.

19. An oil composition of claim 18 wherein said N-allyl amide is an N-allyl formamide.

20. An oil composition of claim 19 wherein said N-allyl formamide is an N,N-diallyl formamide.

21. An oil composition of claim 18 wherein said N-allyl amide is N,N-diallyl acetamide.

22. An ashless dispersant suitable for use in lubricating oil comprising an olefinic hydrocarbon polymer backbone having a molecular weight of about 500–500,000 to which is grafted an N-allyl amide having the structure

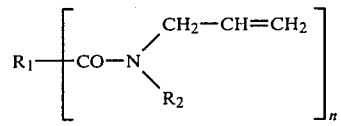

wherein $R_1$ is selected from hydrogen and saturated hydrocarbon groups containing 1 to about 30 carbon atoms or $R_1$ may be absent and $R_2$ is selected from the group consisting of hydrogen, alkyls containing 1–30 carbon atoms, cycloalkyls containing 6–10 carbon atoms, aryls containing 6–10 carbon atoms, and allyl, and n is 1 or 2 such that when $R_1$ is hydrogen n is 1 and when $R_1$ is absent n is 2.

23. An ashless dispersant of claim 22 wherein said olefin polymer backbone is a copolymer of ethylene, an alpha-olefin containing 3–12 carbon atoms, and optionally a diene, said copolymer having an average molecular weight of about 10,000–200,000.

24. An ashless dispersant of claim 23 wherein said N-allyl amide is an N-allyl formamide.

25. An ashless dispersant of claim 24 wherein said N-allyl formamide is N,N-diallyl formamide.

26. An ashless dispersant of claim 23 wherein said N-allyl amide is N,N-diallyl acetamide.

27. A process for making an oil soluble dispersant for use in lubricating oil, said process comprising reacting an N-allyl amide having the structure

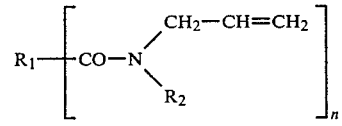

wherein $R_1$ is selected from hydrogen and saturated hydrocarbon groups containing 1 to about 30 carbon atoms or $R_1$ may be absent, and $R_2$ is selected from the group consisting of hydrogen alkyls containing 1–30 carbon atoms, cycloalkyls containing 6–10 carbon atoms, aryls containing 6–10 carbon atoms, and allyl and n is 1 or 2 such that when $R_1$ is hydrogen n is 1, and when $R_1$ is absent n is 2, with an olefinic hydrocarbon polymer having the average molecular weight of about 500–500,000 in the presence of a free radical-generating catalyst whereby said N-allyl amide is grafted onto said olefinic hydrocarbon polymer.

28. A process of claim 27 wherein said olefin polymer is a copolymer of ethylene, a $C_{3-12}$ alpha-olefin and optionally diene containing about 4–15 carbon atoms and has an average molecular weight of about 10,000–200,000.

29. A process of claim 28 wherein said N-allyl amide is an N-allyl formamide.

30. A process of claim 27 wherein said N-allyl formamide is N,N-diallyl formamide.

31. A process of claim 28 wherein said N-allyl amide is N,N-diallyl acetamide.

* * * * *